(12) United States Patent
Chou

(10) Patent No.: US 7,365,740 B2
(45) Date of Patent: Apr. 29, 2008

(54) SCROLL WHEEL DEVICE WITH A THIN FILM TYPE COMMAND SWITCH

(75) Inventor: Chin-Wen Chou, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 574 days.

(21) Appl. No.: 10/870,973

(22) Filed: Jun. 21, 2004

(65) Prior Publication Data

US 2006/0044257 A1    Mar. 2, 2006

(51) Int. Cl.
*G09G 5/08* (2006.01)

(52) U.S. Cl. ............ 345/163; 345/156; 345/157; 345/164; 345/184; 463/37; 463/38; 715/973

(58) Field of Classification Search ........ 345/156–169, 345/184
See application file for complete search history.

(56) References Cited

U.S. PATENT DOCUMENTS 6,188,389 B1    2/2001    Yen 7,079,110 B2 *    7/2006    Ledbetter et al. ........... 345/156
2005/0126389 A1 *    6/2005    Below ............................. 92/71

FOREIGN PATENT DOCUMENTS

TW            365419            7/1999

* cited by examiner

*Primary Examiner*—Richard Hjerpe
*Assistant Examiner*—Jennifer T Nguyen
(74) *Attorney, Agent, or Firm*—Muncy, Geissler, Olds & Lowe, PLLC

(57) ABSTRACT

A scroll wheel device with a thin film type command switch mainly replaces conventional optical grating switch during rotation of a wheel for outputting a signal. The thin film type command switch is a flexible circuit board, and is provided with a circuit arrangement corresponding to a rotating trajectory of the wheel. The wheel is provided with a pressing portion which is simultaneously driven during rotation of the wheel and pressing the thin film type command switch for outputting different command signals. The thin film type command switch of the present invention can decrease the manufacturing cost and save the installation space of the scroll wheel device.

6 Claims, 9 Drawing Sheets

SCROLL WHEEL DEVICE WITH A THIN FILM TYPE COMMAND SWITCH

FIELD OF THE INVENTION

The present invention relates to a scroll wheel device with a thin film type command switch, and more particularly to a scroll wheel device with a thin film type command switch applied to electronic products, such as a computer mouse, a rod, a keyboard, etc. for outputting different command signals.

BACKGROUND OF THE INVENTION

Recently, a user uses a right and left functional keys of electronic products, such as a computer mouse, a rod, a keyboard, etc., to browse document, search homepage, and enlarge and narrow image. Also, the user can use a wheel except the right and left functional keys, wherein the wheel is disposed between the right and left functional keys. A signal is outputted during rotation of the wheel as follows:

Recently, most wheels of the computer mouse is designed and shown in FIG. 1. The computer mouse includes a fixing seat supported the wheel and an axle passed through and disposed in the center of the wheel, wherein the axle is extended to an optical grating switch. During rotation of the wheel, the axle synchronously drives an optical grating sheet which is in the optical grating switch for generating and then outputting different signals of command. But, the wheel is provided with a pressing type switch for exiting the preset functional window of the software and then processing another command when the user presses the pressing type switch, except the wheel outputs the signal of the command during rotation of the wheel. The axle of the wheel and the optical grating switch are mounted together, and therefore the pressing distance of the wheel is requested to consider in accordance with the design of the optical grating switch. This increase the difficulty of the design, and also decrease the lifetime of the optical grating switch because the wheel is frequently pressed. In addition, the manufacture cost of the optical grating switch is high, and the design of the optical grating switch is more complex as the optical grating switch is applied to a computer mouse with smaller size.

In order to achieve tendency towards the minimization of an electronic product, Taiwan Patent No. 365,419 (i.e. U.S. Pat. No. 6,188,389) discloses a third axis input device for a computer mouse including a fixed primary seat, a fixed secondary seat, a wheel, an annular ring-like grating member, a suspending member, and an idle roller. The grating member is hidden, i.e. the grating member is disposed in the wheel for decreasing conventional installation space. However, the wheel in prior art still has a problem of a high cost of the optical grating switch. Furthermore, the size of the wheel is smaller because of the computer mouse with smaller size, and therefore it is more difficult to manufacture the optical grating switch disposed in the wheel.

Accordingly, there exists a need for a scroll wheel device with a thin film type command switch to solve the above-mentioned problems and disadvantages.

SUMMARY OF THE INVENTION

It is an object of the present invention to provide a scroll wheel device with a thin film type command switch which replaces conventional optical grating switch with expensive design cost. The thin film type command switch of the present invention can be a flexible circuit board which decreases the manufacturing cost and easy installation and can output the same signal of the conventional optical grating switch. The thin film type command switch of the present invention is disposed and directly corresponding to a rotating trajectory of the wheel, and therefore the thin film type command switch has no problem of conventional pressing type switch. In addition, the thin film type command switch of the present invention has light weight and small size to meet the requirement of tendency towards the minimization of an electronic product.

In order to achieve the foregoing objects, the present invention provides a scroll wheel device with a thin film type command switch comprising: a supporting seat provided with two frame portions and a rotating space is formed between the two frame portions; a wheel deposed in the rotating space, pivoted on the two frame portions by means a axles, and provided with a pressing portion corresponding to the rotating trajectory of the wheel; and a thin film type command switch disposed and corresponding to the rotating trajectory of the wheel, and comprising a signal portion and a wiring portion extended from the signal portion, wherein the signal portion is pressed by the pressing portion for generating a command signal, and both the signal portion and the wiring portion have a circuit arrangement which is corresponding to the command signal of the wheel.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
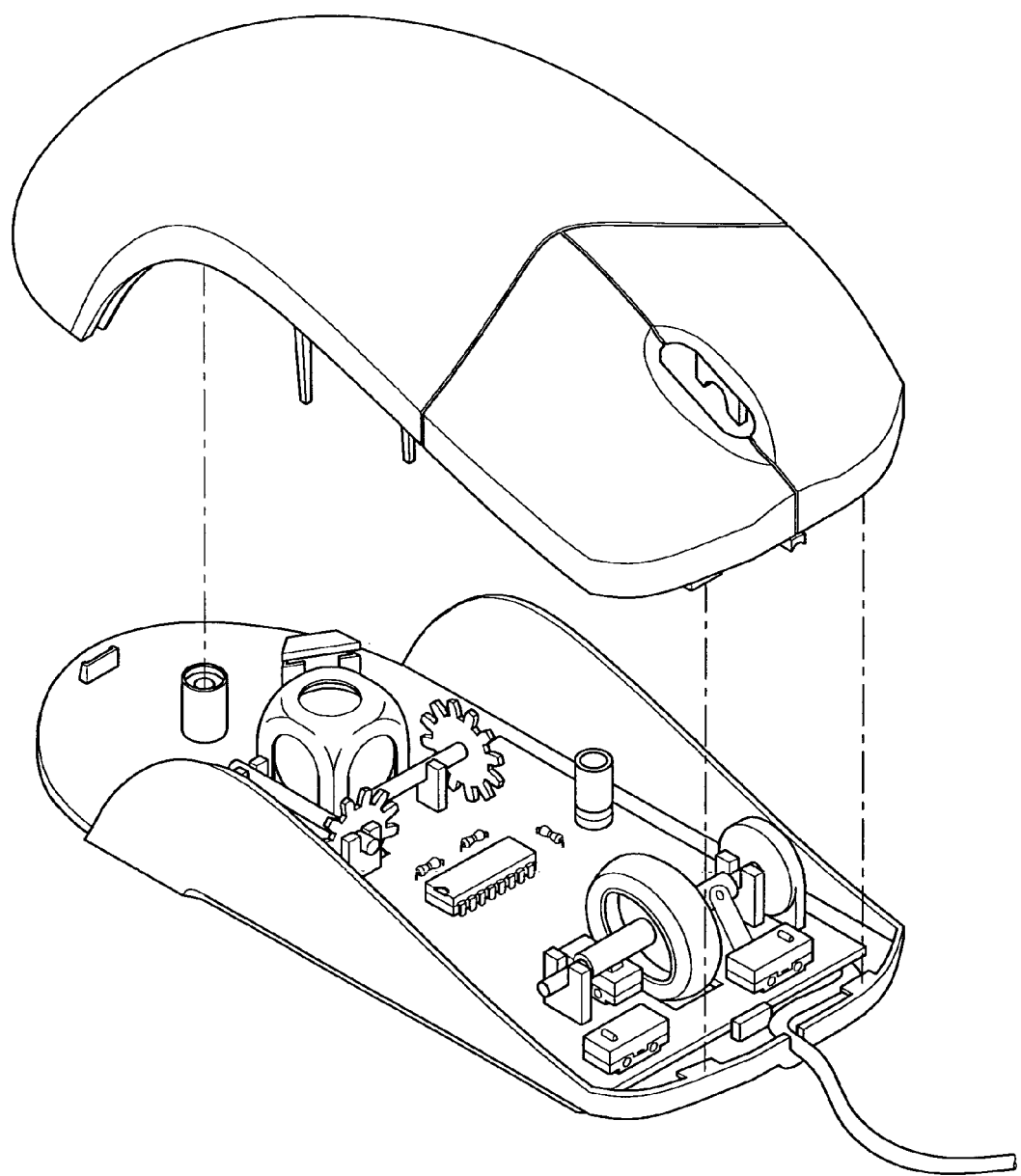
FIG. 1 is a schematic perspective view of conventional scroll wheel device of a computer mouse in the prior art.
Figure 2:
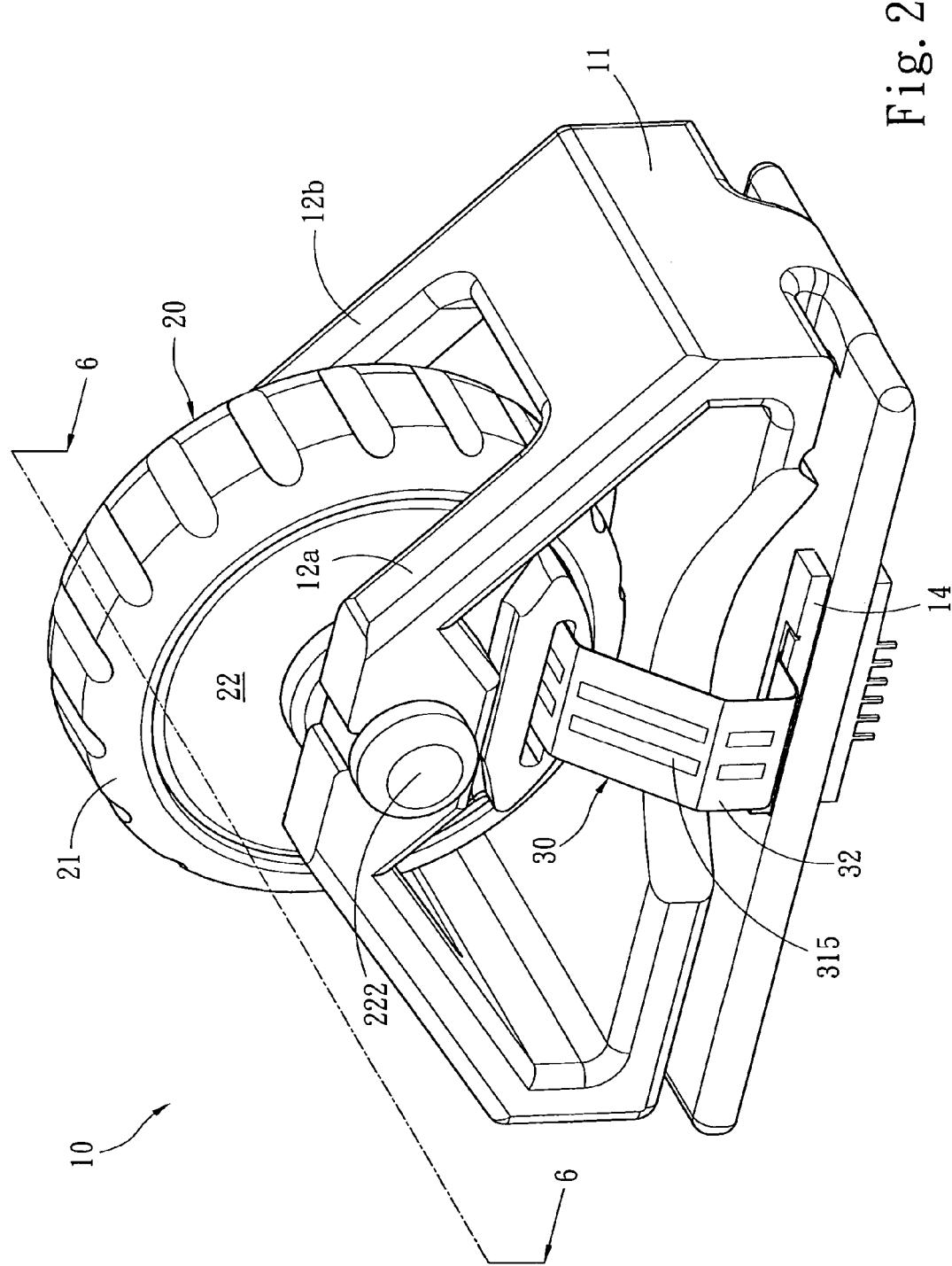
FIG. 2 is a schematic perspective view of a scroll wheel device of the present invention.
Figure 3:
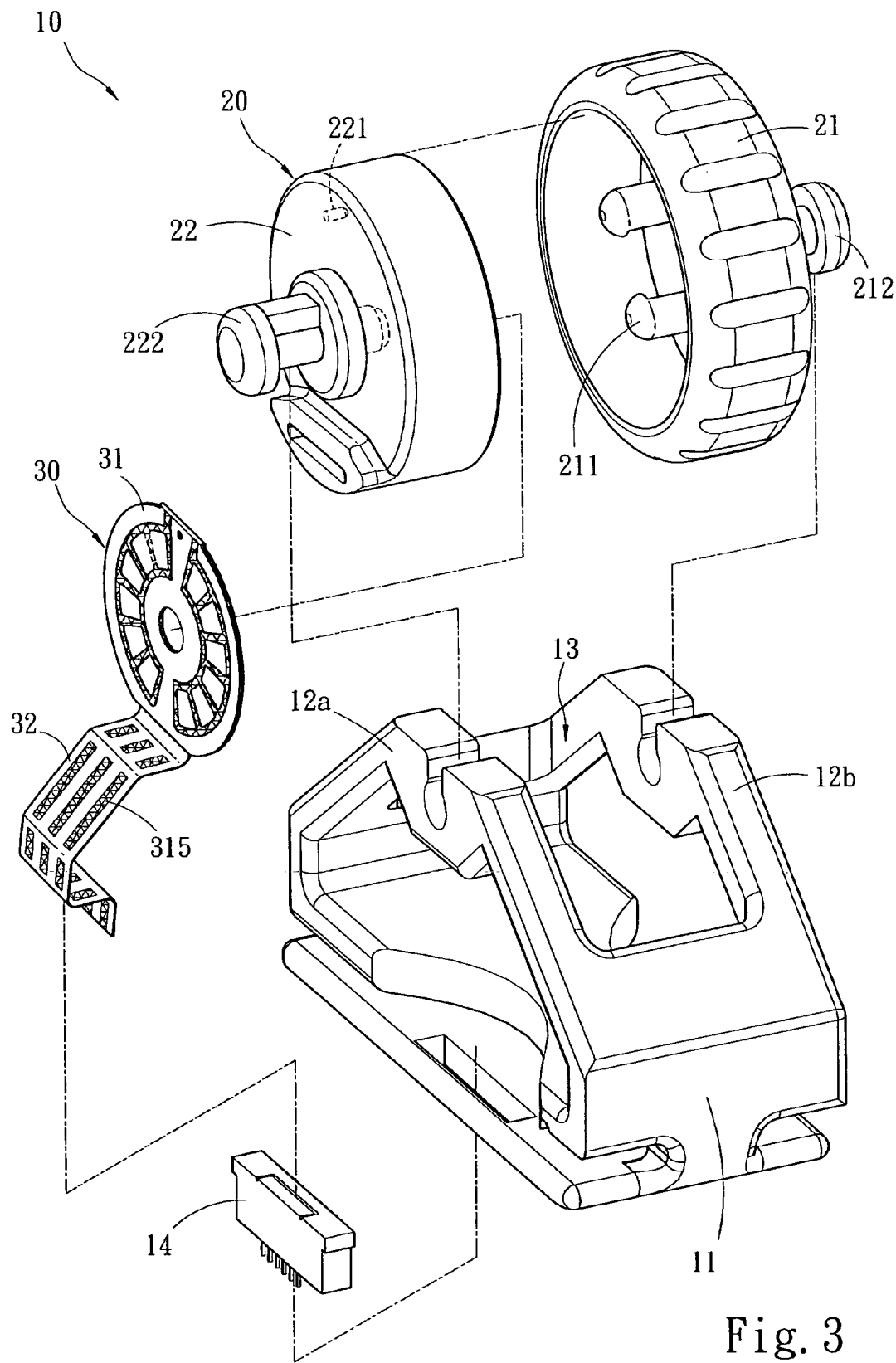
FIG. 3 is a schematic perspective exploded view of a scroll wheel device of the present invention.
Figure 6:
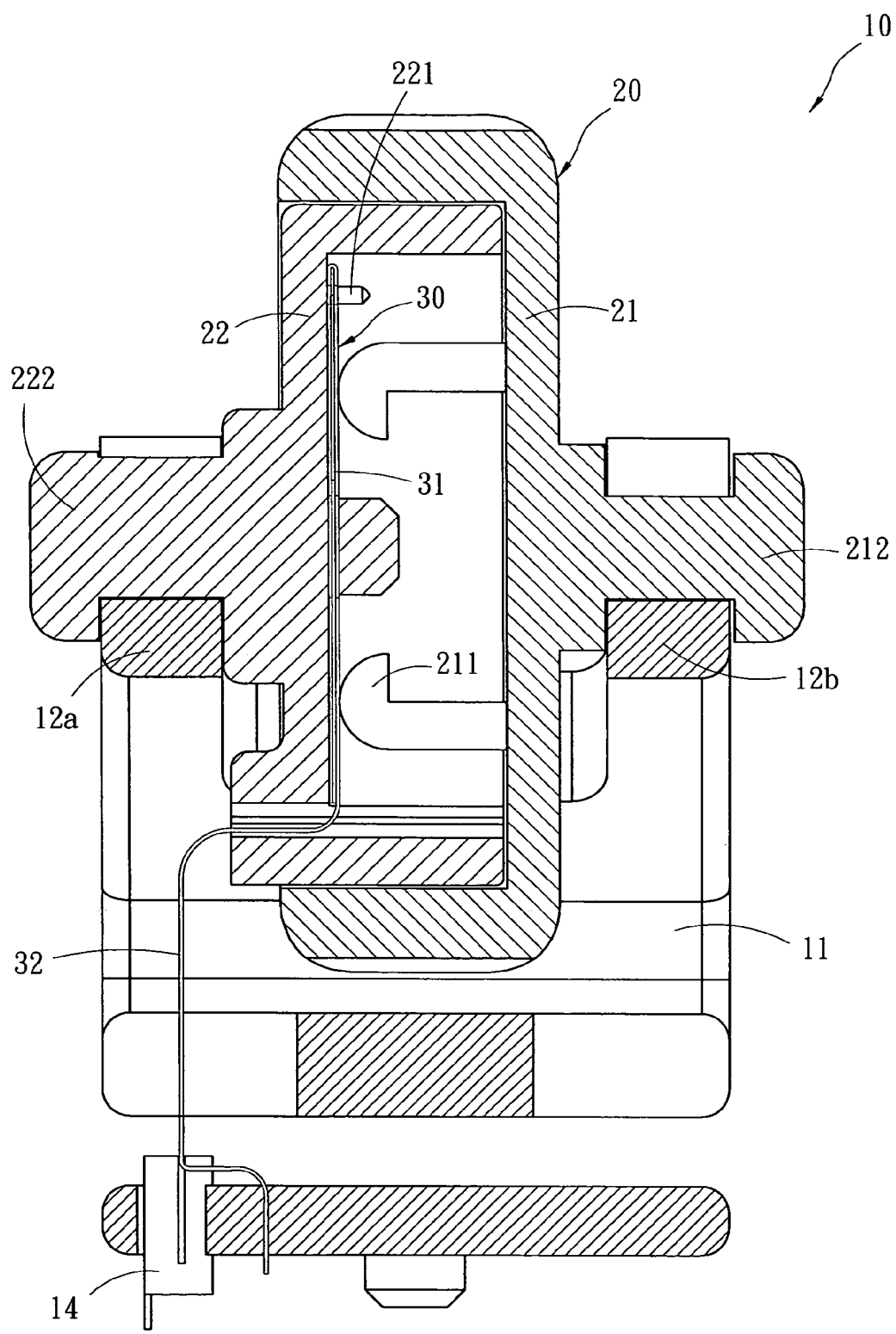
FIG. 6 is a schematic sectional view of the scroll wheel device along the line 6-6 in FIG. 2.

Referring to FIGS. 2, 3 and 6, they respectively depict a perspective view, an exploded perspective view, a sectional view of a scroll wheel device 10 with a thin film type command switch of the present invention. As shown in FIGS. 2, 3 and 6, the scroll wheel device 10 of the prevent invention utilizes the thin film type command switch. The scroll wheel device 10 mainly includes a supporting seat 11. The supporting seat 11 is provided with two frame portions 12a, 12b which are extended from two sidewalls of the supporting seat 11, and a rotating space 13 is formed between the two frame portions 12a, 12b for deposing a wheel 20. The wheel 20 is pivoted on the two frame portions 12a, 12b by means of axles 212, 222, wherein the wheel 20 of the present invention includes an external rotating body 21 and an internal positioning body 22. The external rotating body 21 is provided with a pressing portion 211 which is disposed on an inner side thereof and corresponding to the rotating trajectory of the wheel 20. Also, the internal positioning body 22 is provided with a positioning pin 221, and a thin film type command switch 30 is disposed and corresponding to the rotating trajectory of the wheel 20. The thin film type command switch 30 includes a signal portion 31 and a wiring portion 32 extended from the signal portion 31, wherein the signal portion 31 is disposed at the positioning pin 221 of the internal positioning body 22 and is pressed by the pressing portion 211 for generating a command signal. Both the signal portion 31 and the wiring portion 32 have a circuit arrangement 315 which is corresponding to the command signal of the wheel 20. Also, the supporting seat 11 is provided with a terminal 14 for inserting the wiring portion 32.

Figure 4:
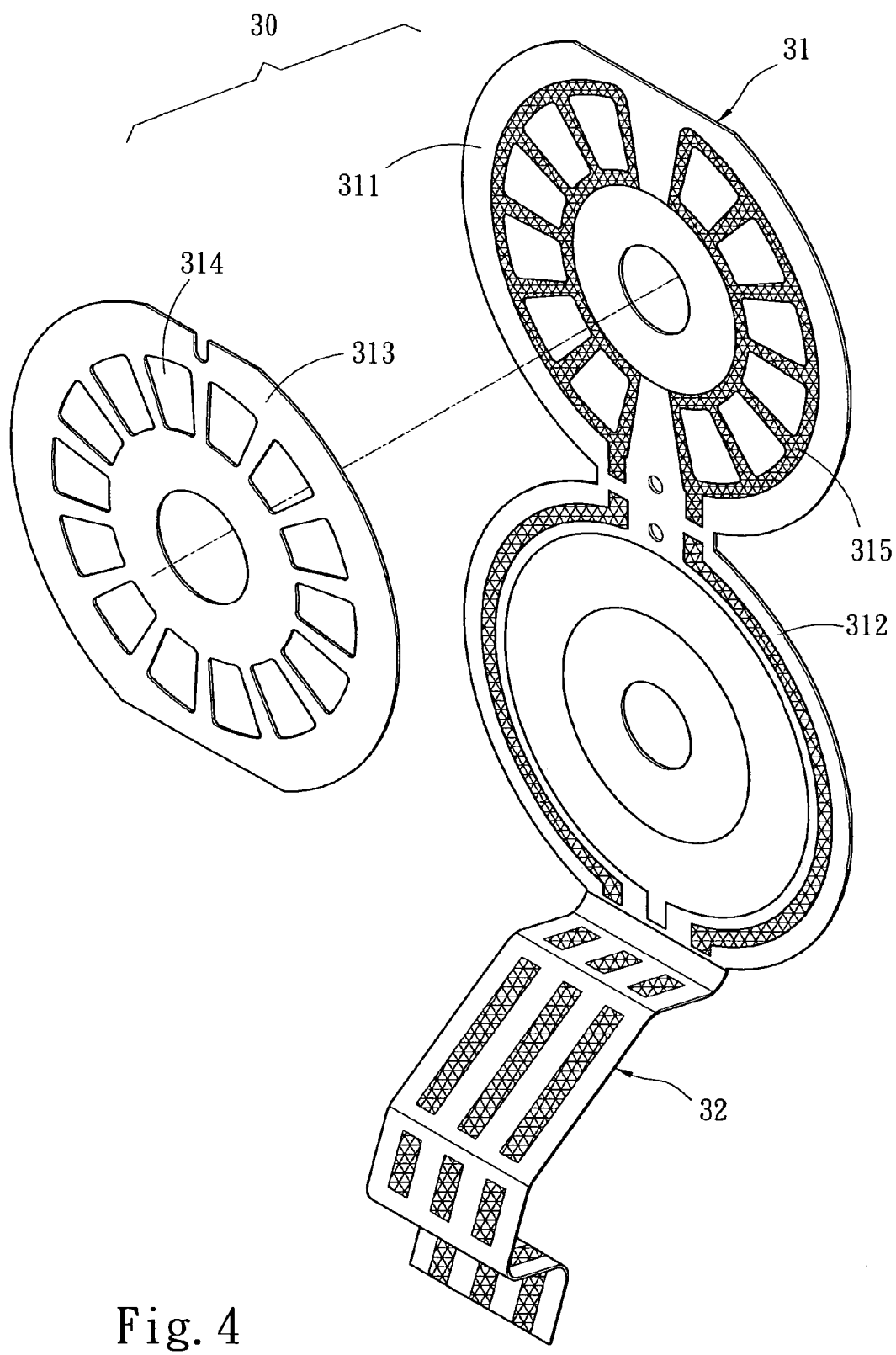
FIG. 4 is a schematic perspective exploded view of a thin film type command switch of the present invention.
Figure 5:
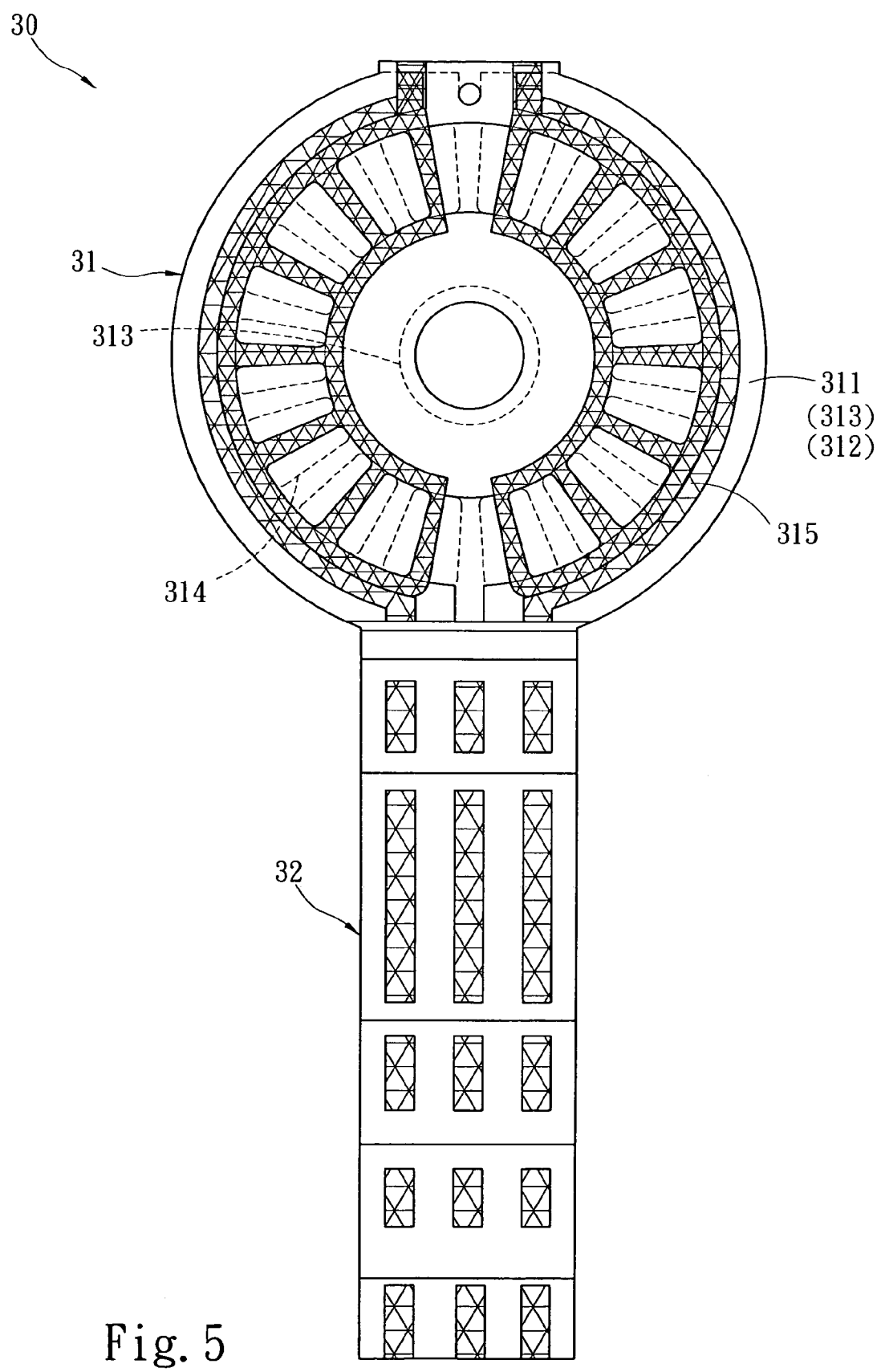
FIG. 5 is a schematic plan view of a thin film type command switch of the present invention showing the assembly of thin film type command switch.

The thin film type command switch 30 of the present invention is formed using a flexible circuit board. As shown in FIGS. 4 and 5, they depict the structure of the thin film type command switch 30. The thin film type command switch 30 can be constituted by two or three layers of circuit boards stacked disposed thereon. For example, the prevent invention utilizes three layers of flexible circuit boards to show an embodiment. The above-mentioned thin film type command switch 30 includes the signal portion 31 and the wiring portion 32 extended from the signal portion 31, wherein the signal portion 31 includes an upper circuit board 311 and a lower circuit board 312 stacked disposed thereon. The signal portion 31 further includes a separating sheet 313 disposed between the upper circuit board 311 and the lower circuit board 312. The separating sheet 313 has a plurality of pressing holes 314 which are corresponding to the circuit arrangement 315. The circuit arrangement 315 is formed by utilizing a printing technology. Thus, the variability of the circuit arrangement 315 of the present invention depends on the preset outputting signal of the wheel 20, e.g., the circuit arrangement 315 is similar to conventional optical grating switch to output signals: ON/OFF, or the wheel 20 utilizes the difference of the circuit arrangement 315 to outputs different command signals in accordance with individual contact of circuit. According to the developed manufacturing technology of the flexible circuit board, the manufacturing cost of the thin film type command switch of the present invention is much lower than that of the conventional optical grating switch. Simultaneously, economic benefits, such as installation convenience, variety of processing signal, etc. of the thin film type command switch of the present invention is much higher than that of the conventional optical grating switch.

Figure 7A:
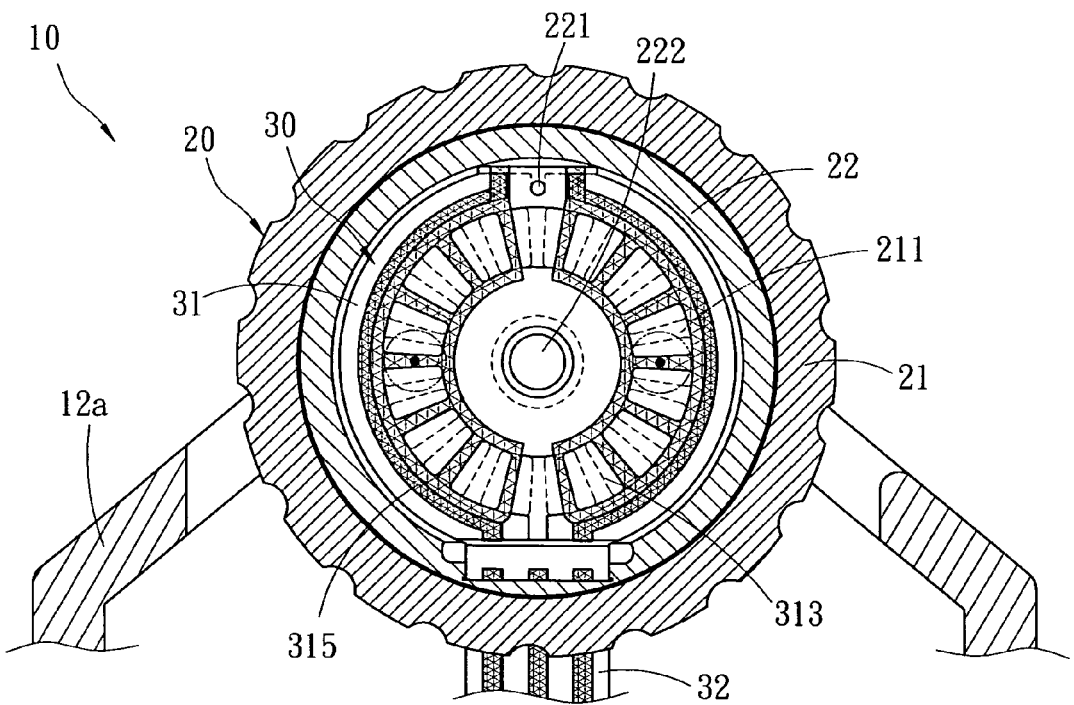
FIGS. 7A and 7B are schematic views showing that the wheel of the present invention outputs a command signal during rotation.
Figure 7B:
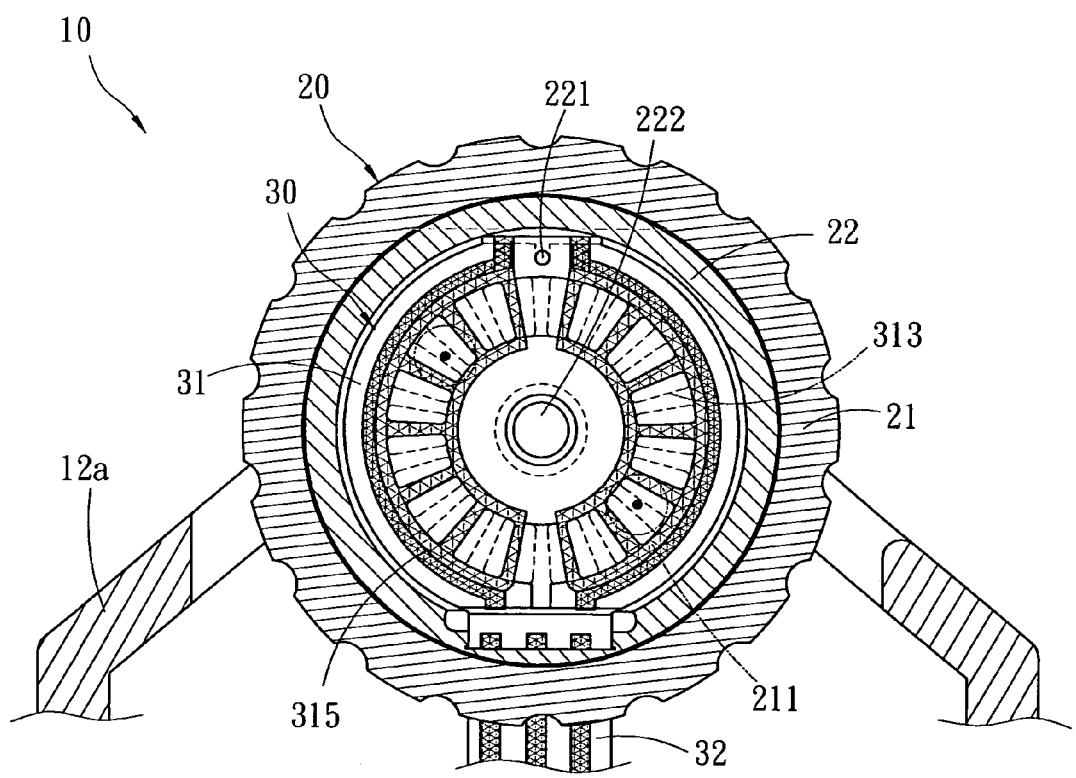

Referring to FIGS. 6, 7A and 7B, they are schematic views showing that the wheel 20 outputs a command signal during rotation. The thin film type command switch 30 is disposed at the positioning pin 221 of the internal positioning body 22, the external rotating body 21 and the internal positioning body 22 of the wheel 20 is assembled and are respectively connected to the frame portions 12a, 12b by means of axles 212, 222, the pressing portion 211 of the external rotating body 21 contacts the signal portion 31 of the thin film type command switch 30, the wiring portion 32 of the thin film type command switch 30 is inserted into the terminal 14 of the supporting seat 11, and then the whole assembly is finished.

A user drives the external rotating body 21 of the wheel 20, and the external rotating body 21 simultaneously drives the pressing portion 211, such that the pressing portion 211 presses the thin film type command switch 30 to form a rotating trajectory.

Simultaneously, any location of the rotating trajectory generates different command signal and outputs from the wiring portion 32 to the terminal 14 by means of the circuit arrangement 315 of the upper circuit board 311 and the lower circuit board 312 of the signal portion 31 and the pressing holes 314 of the separating sheet 313.

Figure 8:
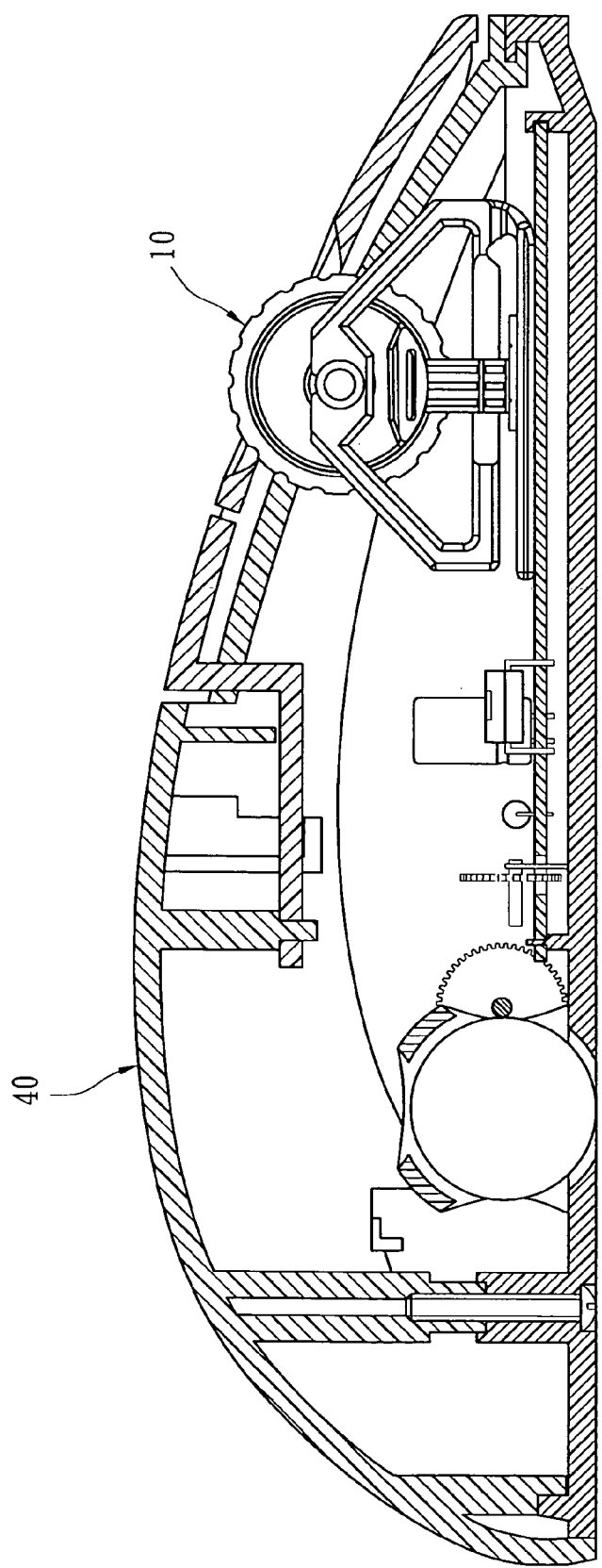
FIG. 8 is a schematic view showing an embodiment that a scroll wheel device of the present invention is disposed at a computer mouse.
Figure 9:
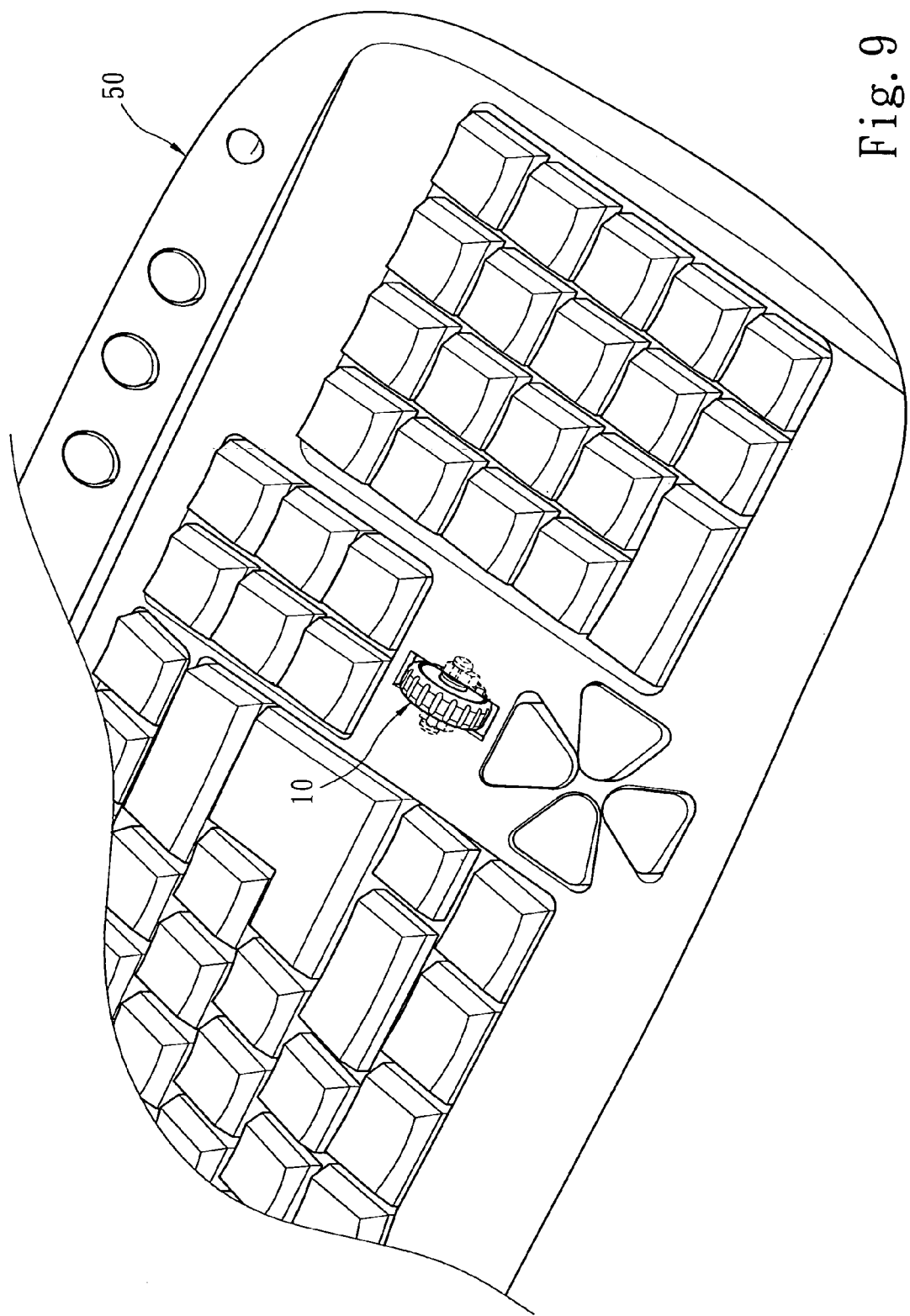
FIG. 9 is a schematic view showing an embodiment that a scroll wheel device of the present invention is disposed at a keyboard.

The present invention can be applied to an electronic device, such as a computer mouse 40 shown in FIG. 8, or a keyboard 50 shown in FIG. 9.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A scroll wheel device with a thin film type command switch comprising:
  a supporting seat provided with two frame portions and a rotating space formed between the two frame portions;
  a wheel deposed in the rotating space, pivoted on the two frame portions by means of axles, and provided with a pressing portion corresponding to a rotating trajectory of the wheel;
  a thin film type command switch disposed and corresponding to the rotating trajectory of the wheel, and comprising a signal portion and a wiring portion extended from the signal portion, wherein the signal portion is pressed by the pressing portion for generating a command signal, and both the signal portion and the wiring portion have a circuit arrangement which is corresponding to the command signal of the wheel;
  the thin film type command switch is a flexible circuit board, and the signal portion comprises an upper circuit board and a lower circuit board provided with the circuit arrangement; and
  the signal portion further comprises a separating sheet disposed between the upper circuit board and the lower circuit board and having a plurality of pressing holes which are corresponding to the circuit arrangement.

2. The scroll wheel device with a thin film type command switch according to claim 1, wherein the supporting seat is provided with a terminal for inserting the wiring portion.

3. The scroll wheel device with a thin film type command switch according to claim 1, wherein the wheel comprises an external rotating body and an internal positioning body, and the pressing portion is disposed on an inner side of the external rotating body, the internal positioning body is provided with a positioning pin for deposing the signal portion.

4. The scroll wheel device with a thin film type command switch according to claim 1, wherein the scroll wheel device is disposed at a computer mouse.

5. The scroll wheel device with a thin film type command switch according to claim 1, wherein the scroll wheel device is disposed at a keyboard.

6. A thin film type command switch for providing a wheel with outputting a command signal corresponding to a rotating trajectory of the wheel, wherein:
  the thin film type command switch is a flexible circuit board, and provided with a circuit arrangement corresponding to the rotating trajectory of the wheel,
  the wheel is provided with a pressing portion simultaneously driven during rotation of the wheel and pressing the thin film type command switch such that the pressing portion contacts the thin film type command switch at different location of the rotating trajectory to output different command signals,
  the thin film type command switch comprises a signal portion and a wiring portion extended from the signal portion, wherein the signal portion comprise an upper circuit board and a lower circuit board stacked disposed on thereof; and
  the signal portion further comprises a separating sheet disposed between the upper circuit board and the lower circuit board, and having a plurality of pressing holes which are corresponding to the circuit arrangement.

* * * * *